United States Patent [19]
Kishi

[11] Patent Number: 6,029,179
[45] Date of Patent: Feb. 22, 2000

[54] AUTOMATED READ-ONLY VOLUME PROCESSING IN A VIRTUAL TAPE SERVER

[75] Inventor: Gregory Tad Kishi, Oro Valley, Ariz.

[73] Assignee: International Business Machines Corporation, Armonk, N.Y.

[21] Appl. No.: 08/993,456

[22] Filed: Dec. 18, 1997

[51] Int. Cl.⁷ .................................................. G06F 17/30
[52] U.S. Cl. .......................................... 707/202; 707/104
[58] Field of Search ................................... 707/202, 204, 707/10, 104

[56] References Cited

U.S. PATENT DOCUMENTS

| | | | |
|---|---|---|---|
| 4,467,421 | 8/1984 | White | 711/118 |
| 4,750,113 | 6/1988 | Buggert | 710/64 |
| 4,755,928 | 7/1988 | Johnson et al. | 362/200 |
| 4,914,656 | 4/1990 | Dunphy, Jr. et al. | 714/710 |
| 5,287,459 | 2/1994 | Gniewek | 369/34 |
| 5,371,882 | 12/1994 | Ludlam | 714/7 |
| 5,418,940 | 5/1995 | Mohan | 395/575 |
| 5,553,233 | 9/1996 | Ikeda | 395/182.11 |
| 5,604,862 | 2/1997 | Midgely et al. | 714/6 |
| 5,673,382 | 9/1997 | Cannon et al. | 395/182.04 |
| 5,761,404 | 6/1998 | Murakami et al. | 395/182.13 |
| 5,872,905 | 2/1999 | Ono et al. | 395/182.03 |
| 5,887,270 | 3/1999 | Brant et al. | 711/162 |

FOREIGN PATENT DOCUMENTS

0628906 A2   12/1994   United Kingdom .......................... 3/6

OTHER PUBLICATIONS

Mosse et al., "Analysis of Fault Tolerant Multiprocessor Scheduling Algorithm", Fault Tolerant Computing, Int'l Symposium, IEEE pp. 16–15, 1994.

King et al., "Overview of Disaster Recovery for Transaction Processing Systems", Distributed Computing Systems, Int'l Conf. IEEE, pp. 286–293, 1990.

Primary Examiner—Thomas G. Black
Assistant Examiner—Frantz Coby
Attorney, Agent, or Firm—Altera Law Group, LLC

[57] ABSTRACT

A method and system are described for recovering data from an unreliable tape within a tape server which includes a plurality of tape drives, a direct access storage device, and a storage manager. After the storage manager is queried for a list of all volumes that have been written to the unreliable tape, a status of a volume on the list is determined. The volume is written onto the direct access storage device from the unreliable tape where indicated by the status of the volume, and the volume stored on the direct access storage device is made to appear to be a new version of the volume where indicated by the status of the volume.

24 Claims, 5 Drawing Sheets

AUTOMATED READ-ONLY VOLUME PROCESSING IN A VIRTUAL TAPE SERVER

BACKGROUND OF THE INVENTION

1. Field of the Invention

This invention relates in general to data storage and processing, and more particularly a method for recovering data from a damaged tape drive.

2. Description of Related Art

In hierarchical storage systems, intensively used and frequently accessed data is stored in fast but expensive memory. One example of a fast memory is a direct access storage device (DASD). In contrast, less frequently accessed data is stored in less expensive but slower memory. Examples of slower memory are tape drives and disk drive arrays. The goal of the hierarchy is to obtain moderately priced, high-capacity storage while maintaining high-speed access to the stored information.

One such hierarchical storage system is a virtual tape storage system (VTS), including a host data interface, a DASD, and a number of tape devices. When the host writes a logical volume, or a file, to the VTS, the data is stored as a file on the DASD. Although the DASD provides quick access to this data, it will eventually reach full capacity and a backup or secondary storage system will be needed. An IBM 3590 tape cartridge is one example of a tape device that could be used as a backup or secondary storage system.

When the DASD fills to a predetermined threshold, the logical volume data for a selected logical volume, typically the oldest, is removed from the DASD to free space for more logical volumes. The selected DASD file is then appended onto a tape cartridge, or a physical volume, with the original left on the DASD for possible cache hits. When a DASD file has been appended to a tape cartridge and the original remains on the DASD, the file is "premigrated".

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

The VTS uses a storage manager to transfer data between the DASD and storage tapes. The storage manager is controlled by an automated administrator program. In order for the VTS to appear as a black box to the customer, it may run unattended for months. One of the most important requirements of a VTS is to ensure integrity and safety of data. When a physical tape volume exhibits a tape error or a permanent write error, error recovery is first attempted. If error recovery efforts fail, it is a good indication that something is wrong with either the tape drive or the tape. In this situation, the suspect physical tape volume is deemed "read-only" by the storage manager. The tape volume is assumed to be potentially degraded or at least not having the same long-term reliability as a normal tape. Once a physical tape volume is considered suspect, the only way to ensure long-term reliability of the data already written to the tape is to read it from the tape and store it on another tape.

In this situation, the automated administrator may instruct the storage manager to copy all volumes on the suspect tape to another tape. However, some of the volumes on the suspect tape may no longer be the current version of the logical volume. If all volumes on the suspect tape were copied, substantial duplication of storage would result. Newer or identical versions of those files may exist in other locations, or may still be resident on the DASD.

Another approach to prevent the loss of data from an unreliable tape is using backup systems. One known computer backup system periodically copies volumes from the tape device to a backup tape device or other storage device. In a full backup, all files of the disk are copied to tape. This approach often requires that access to the tape device that is being backed up is not possible until the process is complete. In an incremental backup, only tape volumes that have changed since the previous backup are copied.

Then, if a tape becomes unreliable, the last version of each volume that was backed-up to another storage device can be restored by mounting the storage device and copying the backup device's content to a new tape. However, one problem with periodic backups is that an error may occur after a new version has been written to the unreliable tape, but before a backup process has taken place.

Another data protection scheme maintains a redundant set of the logical volumes that are stored on each tape. Each time a volume is written from the DASD to a tape device, a second copy of the volume could be mirrored on another tape. Then, if one tape device becomes unreliable, the storage manager may determine a list of volumes that were on the unreliable tape device, and then determine the location of the mirror copy corresponding to each of the volumes on the unreliable tape.

Full copying of an unreliable tape, backup methods, and redundant storage methods all employ considerable space on tape devices to carry out. Methods for protecting volume on tape devices are needed that do not use excessive amounts of storage space or require additional tape devices on the VTS.

It can be seen that there is a need for automated read-only volume recovery that takes into account the fact that files may be stored in more than one location within the virtual tape system so that files are not copied unnecessarily.

It can also be seen that there is a need for a system that determines the state of the file being recovered and how the recovery is performed, in addition to removing all data from the suspect tape and then ensuring that it is ejected from the VTS, so that data recovery is accomplished with minimal human intervention.

SUMMARY OF THE INVENTION

To overcome the limitations in the prior art described above, and to overcome other limitations that will be apparent upon reading and understanding the present specification, the present invention discloses a method of recovering data from an unreliable tape within a tape server.

A method of recovering data from an unreliable tape within a tape server is described. The tape server comprises a plurality of tape drives, a direct access storage device, and a storage manager, where data is stored on the direct access storage device and stored on one or more tapes. The method includes the steps of querying the storage manager for a list of all volumes that have been written to the unreliable tape, determining a status of a volume on the list, writing the volume onto the direct access storage device from the unreliable tape where indicated by the status of the volume, and causing the volume that is stored on the direct access storage device to appear to be a new version of the volume where indicated by the status of the volume.

The system for recovering data of the present invention from an unreliable tape within a tape server includes a direct access storage device, a plurality of tape drives, operatively coupled to the direct access storage device to receive data, and a storage manager. The system also includes a query subsystem configured to query the storage manager for a list of all volumes that have been written to the unreliable tape and determine a status of a volume on the list, a write subsystem configured to write the volume onto the direct access storage device from the unreliable tape where indicated by the status of the volume, and an update subsystem configured to cause the volume that is stored on the direct access storage device to appear to be a new version of the volume where indicated by the status of the volume.

These and other advantages and features of novelty which characterize the invention are pointed out with particularity in the claims annexed hereto and form a part of this application. However, for a better understanding of the invention, its advantages, and the objects obtained by its use, reference should be made to the drawings which form a further part of this application, and to accompanying descriptive matter, in which there are illustrated and described specific examples of an apparatus in accordance with the invention.

BRIEF DESCRIPTION OF THE DRAWINGS

Referring to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an automated administrator for a virtual tape storage system (VTS) that will copy only those files from a possibly damaged tape that are not located elsewhere within the virtual tape server. First the automated administrator determines a list of volumes on the damaged tape. Then the status of each volume is determined, which indicates whether the original file is still resident on the DASD, if a more recent version is stored on a different tape, or if the most recent version is only stored on the damaged tape. If the original volume is still on the DASD, that volume is updated to look like a new file on a direct access storage device file buffer (DASD), so that it will later be queued for migration to another tape within the server. If the newest version is only on the damaged tape, the version on the suspect tape is copied onto the DASD and also made to look like a new version of the volume, and then later queued for migration to another tape.

Figure 1:
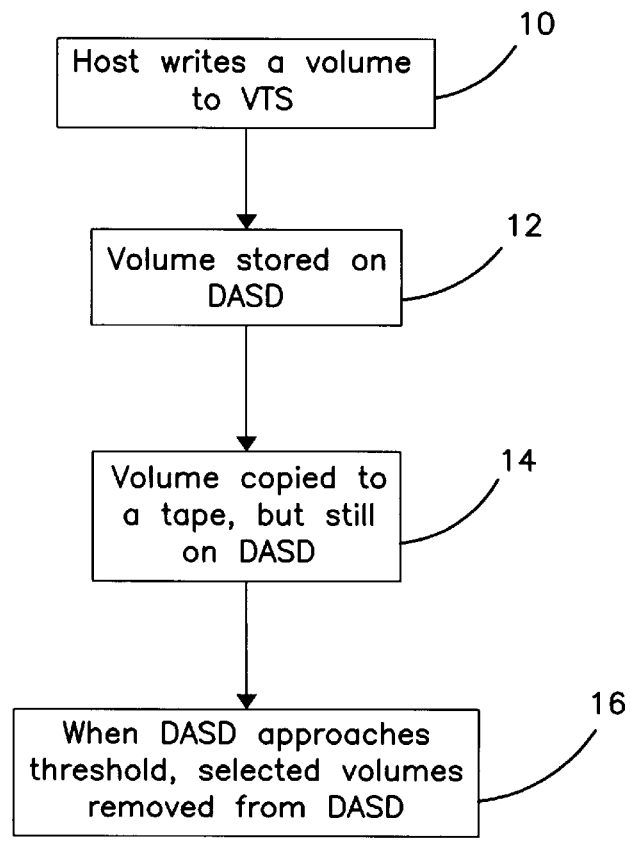
FIG. 1 is a flowchart showing one embodiment of normal operation of a virtual tape server.

The normal writing operation of a typical virtual tape server is shown in FIG. 1. When the host writes a logical volume, or file, to the VTS at step 10, the data is stored as a file on the DASD at step 12. This DASD volume is later appended onto a tape cartridge, or a physical volume, with the original left on the DASD for possible cache hits at step 14. This step is termed premigration. A tape cartridge, such as an IBM 3590 tape cartridge, could be used. When the DASD fills to a predetermined threshold, the logical volume data for a selected logical volume, typically the oldest, is removed from the DASD to free space for more logical volumes at step 16.

When the host reads a logical volume from the VTS, a cache hit occurs if the logical volume currently resides on the DASD. If the logical volume is not on the DASD, the storage manager determines which of the physical tape volumes contains the logical volume. The corresponding physical volume is then mounted on one of the tape devices, and the data for the logical volume is transferred back to the DASD from the tape.

Figure 2:
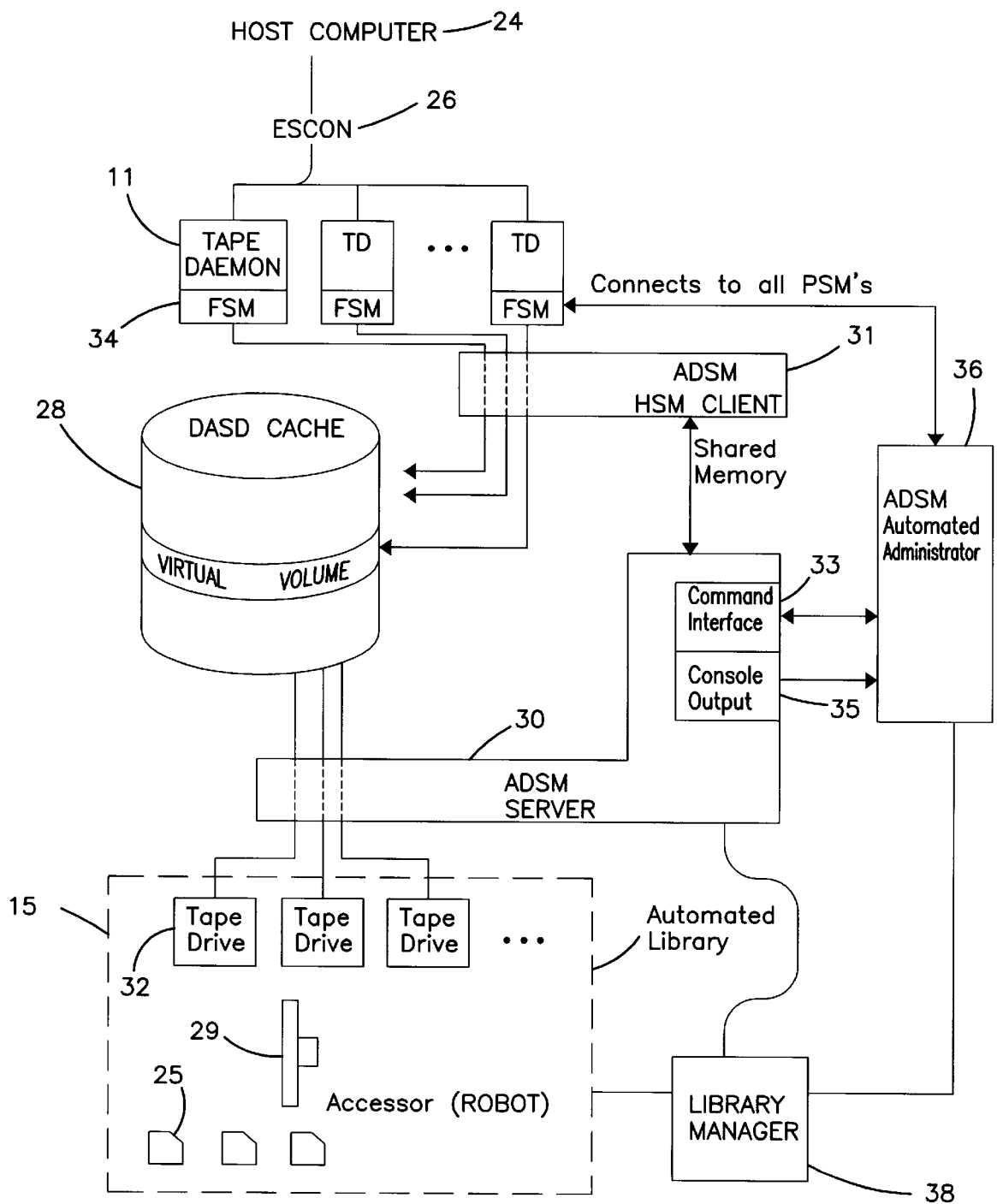
FIG. 2 is a block diagram showing one embodiment of a system for automated volume recovery within a virtual tape server.

FIG. 2 shows an overview of the system components of one embodiment of the present invention. The virtual tape system (VTS) 22 may be in communication with a host computer 24 via a host-to-data interface 26. The host-to-data interface 26, such as IBM's Enterprise Systems Connection (ESCON), may be a fiber optic local area network used to link mainframes to disk drives or other mainframes. The virtual tape server system 22 includes a DASD cache 28, a storage manager 30, and a plurality of tape devices 22 in an automated library 15. The multiple tape devices 32 are serviced by an accessor, or robot, 29 that obtains a desired tape 25 from the tape library. From the host computer 24, tape daemons 11 may appear to be multiple tape devices attached to the host-to-data interface, or ESCON, 26.

The host to DASD data transfer in the VTS 22 may be controlled by VTS code, such as being directly controlled by a VTS File System Manager 34 (FSM) which handles the actual DASD read and write commands in one embodiment, via a hierarchical storage manager (HSM) client 31. The DASD 28 to tape device 32 interface is controlled by a storage manager server 30. One example of a storage manager that could be used as the VTS storage manager 30 or the HSM client 31 is the Adstar® Distributed Storage Manager (ADSM) sold by IBM. The storage manager 30 may have a command interface 33 and a console output 35.

The storage manager 30 is controlled by a VTS automated storage manager administrator 36, such as an automated ADSM administrator for the VTS. The host-to-data interface 26 may be responsible for sending messages to a human operator.

The automated administrator 36 provides the administrative functions needed to achieve the read-only tape copying of the present invention, and additionally performs many VTS specific administrative functions on the storage manager 30. Multiple interfaces to the storage manager 30 allow the automated administrator 36 to mimic the operations performed by a human storage manager administrator, such as the automated processing of physical tape volumes made read-only by the storage manager so that storage resources are conserved.

As discussed above, a physical tape volume is made read-only by the storage manager whenever a permanent tape error or a permanent write error occurs, which is only reported from the tape drive after considerable error recovery has been attempted. When such an error occurs, the physical tape volume is considered suspect, and the only way to ensure long-term reliability of the VTS logical volumes, or files, already written to the tape is to read them from the tape and store them on another tape. The automated administrator 36 performs this copying operation automatically, taking into account other locations of the volumes on the suspect tape.

Figure 3:
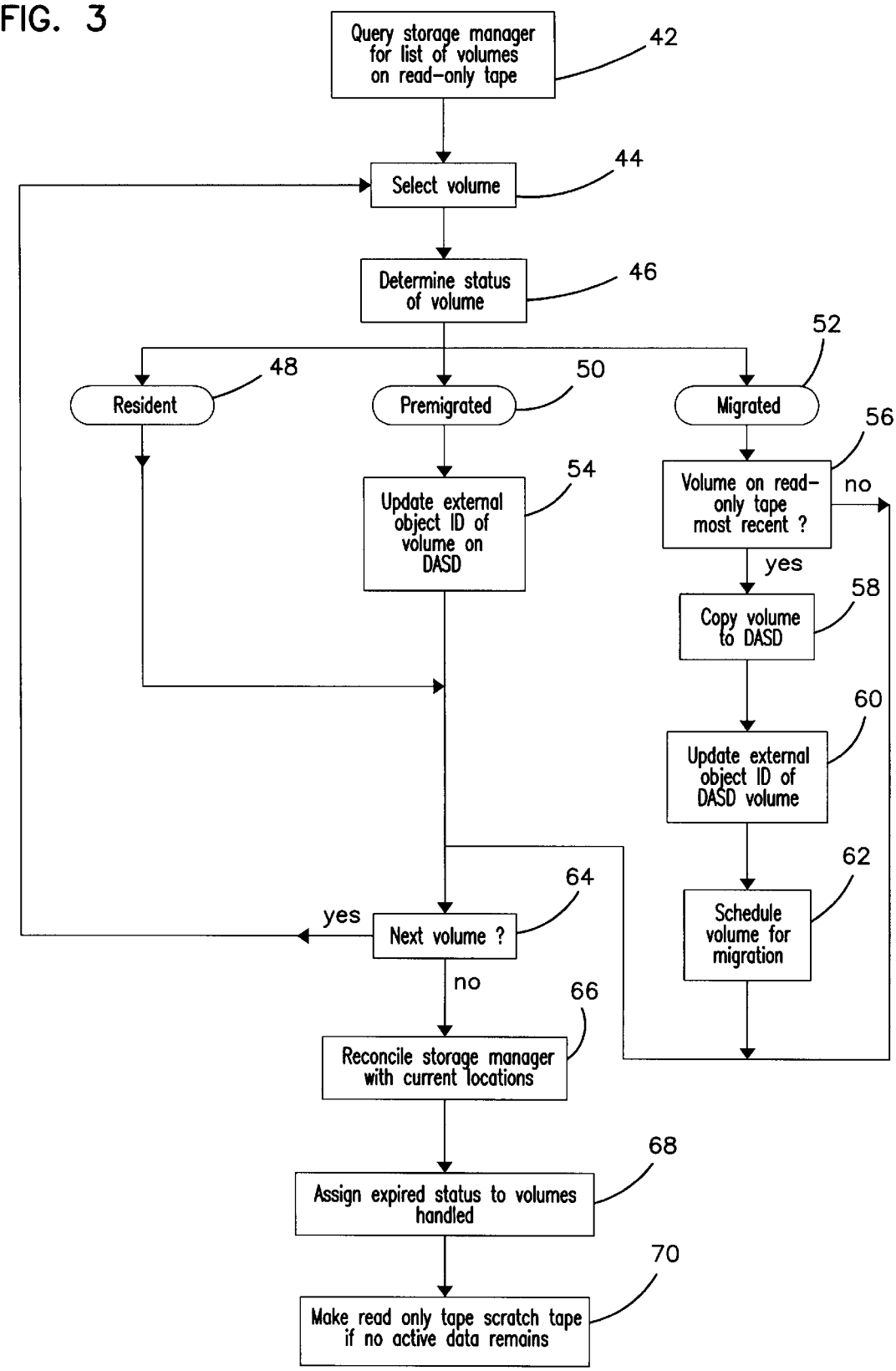
FIG. 3 is a flowchart showing one embodiment of the read-only tape processing of the present invention.

The steps of the volume recovery process of one embodiment of the present invention are shown in FIG. 3. There is no direct way to determine from the storage manager exactly what VTS logical volumes are current volumes that are not stored elsewhere, and therefore must be read off the tape. Whenever a logical volume is written to a physical tape volume, the storage manager 30 will report it as being in the contents for that tape volume. If the logical volume is updated, either on the VTS DASD, or written by the storage manager 30 to another physical tape volume, the storage manager 30 will still report the logical volume as being on the original physical tape volume.

The first step in read-only processing performed by the automated administrator 36 is to query the storage manager 30 for a list of all the logical volumes or files that the storage manager 30 has written to the physical volume at step 42. This list is processed by the automated administrator 36 one volume at a time by selecting a first volume at step 44.

For each logical volume reported, the automated administrator 36 may issue a get-ID function call to the storage manager 30 to receive the storage manager external object identification for the logical volume. The external object identification is an identifier used by the storage manager 30 to describe the most recent version of the logical volume. The get-ID function may also report a status of the volume as being resident, premigrated, or migrated, which is indicative of whether copying or updating of other volumes is necessary, to complete step 46.

If the logical volume is reported as being resident 48, the data for the logical volume is on the VTS DASD, and any versions of the logical volume on physical tape volumes have been superseded. In this case, the logical volume is skipped, since no interest exists in the version of the logical volume on the read-only physical volume.

If the logical volume is reported as being premigrated 50, the data for the logical volume is on the VTS DASD, and on a VTS physical tape. In this case, the automated administrator 36 causes the file to appear updated to the storage manager 30 at step 54. This may be accomplished by giving the file a new unique external object identification, after which the storage manager 30 will assume the most recent version of the logical volume is the one on the DASD and is not on a physical tape. This ends the processing for this logical volume.

If the logical volume is reported as being migrated 52, the data for the logical volume is on a physical tape volume. The automated administrator 36 queries the storage manager 30 for the physical volume, or more than one volume if the file spans multiple tapes, that the most recent version of the file is located on at step 56. If none of the physical volumes reported matches the read-only physical volume, the most recent version of the logical volume is on another physical tape, and the current logical volume is skipped. The administrator proceeds to the next volume at step 64.

If, instead, the logical volume is reported as being completely or partially on the read-only physical volume, the automated administrator 36 may issue a recall to make the storage manager 30 read the data from the read-only physical volume to the VTS DASD at step 58 and copy the volume onto the DASD. If the file is recalled successfully, the automated administrator 36 makes the file appear to be updated to the storage manager 30, and gives it a new unique external object identification at step 60, after which the storage manager 30 will assume the most recent version of the logical volume is the one on DASD, and is not on a physical tape. A message is placed on an internal administrator message queue, queuing this logical volume for migration by an administrator asynchronously running file migration thread at step 62. When the file is migrated, its data is removed from the VTS DASD, freeing space for more recent files. This ends the processing for this logical volume. At step 64, the automated administrator determines if additional volumes on the suspect tape need to be processed, returning to step 44 if yes.

After all the logical volumes in the list have been processed, the automated administrator 36 reconciles current locations with the storage manager at step 66. This operation synchronizes the storage manager 30 server database to the current state of all the VTS logical volumes that were on the suspect tape. VTS may then assign a server expiration time constant of zero at step 68, indicating that any files that have been replaced by more recent versions can be considered expired, although they will still be reported in the contents of the tape. When the reconciliation has completed, if all the recent versions of logical volumes have been recalled off the read-only physical volume and made to appear updated on the VTS DASD, the physical volume may be made into a scratch tape by the storage manager 30 at step 70.

Figure 4:
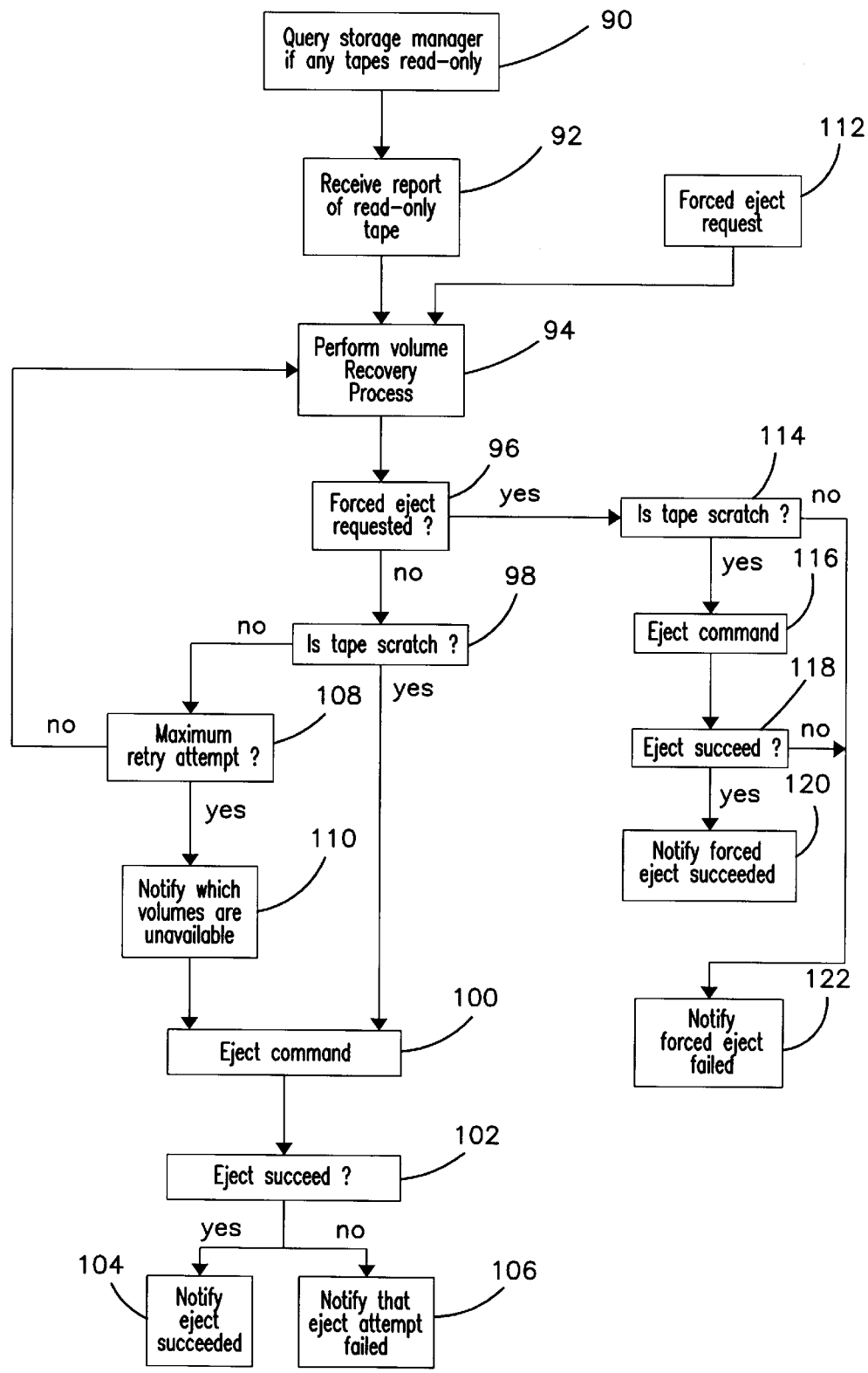
FIG. 4 is a flowchart showing one embodiment of the volume recovery process of the present invention.

Now referring to FIG. 4, volume recovery process shown in FIG. 3 will be placed in the context of the read-only tape processing. During normal operation, the automated administrator 36 queries the storage manager at regular intervals to determine if any tapes have been made read only at step 90. The interval may be one hour, for example. A positive response at step 92 initiates the volume recovery process at step 94, which is set forth in detail in FIG. 3. The volume recovery process may also begin whenever an appropriate error message is generated by the storage manager. When a read-only tape is detected, the automated administrator 30 invokes its automated read-only recovery at step 94.

If a forced eject request is not being processed at step 96, then the automated administrator 36 may query a storage manager library volume table to ensure the physical volume is a scratch tape at step 98. The automated administrator 36 may also query the storage manager volume table to ensure the volume doesn't appear in the table, and therefore has no data.

If the physical volume is an empty scratch tape, the automated administrator 36 may issue a checkout command for the physical tape, indicating to the storage manager 30 that it should eject the tape at step 100. If this succeeds at step 102, the automated administrator 36 sends an operator intervention message to the library manager that notifies the operator that a tape with damaged media has been ejected at step 104. If it fails, the automated administrator 36 sends an operator intervention message to the library manager at step 106 that notifies the operator that an attempt was made to eject a tape with damaged media, but it failed.

If any failure occurs, such as the tape not being a scratch tape, the entire process may be repeated several times, until either it succeeds, or the maximum number of retries is exceeded. Until the maximum retry attempts are reached at step 108, the process again tries volume recovery at step 96. If, after all the retries, the volume has not been converted to a scratch volume at step 108, the file list may be scanned one more time, except this time an operator intervention message is sent to the library manager for each volume on the physical volume that would be a candidate for recall during read-only processing. This operator intervention message notifies the operator what logical volumes are no longer accessible to the VTS at step 110. The automated administrator 36 then issues a checkout command for the physical tape, indicating to the storage manager 30 that it should eject the tape at step 100. The process following the eject command is the same as discussed above for a check out procedure.

The automated administrator 36 may also support a forced eject function for a specific physical tape volume. In this case the library manager sends a request to the automated administrator 36 at step 112 with a specific physical volume label to eject. The automated administrator 36 performs the same steps as it would for read-only recovery at step 94, except no retry is performed. If, after a single pass, the tape is made into an scratch tape at step 114, the automated administrator 36 issues a checkout command for the physical tape, indicating to the storage manager 30 that it should eject the tape at step 116. If this succeeds at step 118, the automated administrator 36 sends a message to the library manager indicating the forced eject succeeded at step 120. In any other case, the automated administrator 36 sends a message to the library manager indicating the forced eject failed at step 122.

Using the processes described in this disclosure, the automated administrator 36 is able to automatically retrieve data from, and eject read-only physical volumes to help ensure that VTS data is stored on tapes of known good quality. In addition, data stripping and ejection of specific physical volumes is supported.

Figure 5:
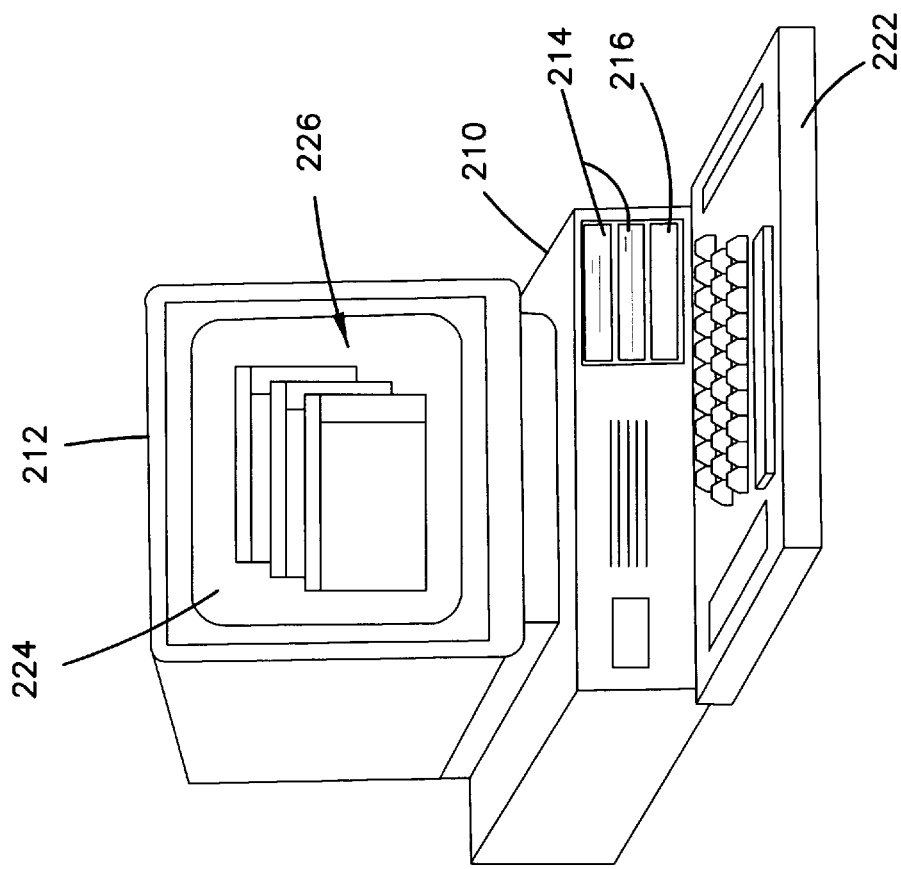
FIG. 5 is a block diagram showing a hardware environment that may be used with the present invention.

FIG. 5 is a block diagram that illustrates an exemplary hardware environment of the present invention for recovering data from an unreliable tape. The present invention is typically implemented using a computer 210 comprised of a microprocessor, random access memory (RAM), read-only memory (ROM), and other standard components. It is envisioned that attached to the computer 210 may be a monitor 212, floppy disk drives 214, CD-ROM drives 216, and other peripherals. Also included in the preferred embodiment may be input devices, for example, a keyboard 222.

The computer 210 operates under the control of an operating system 224, such as the Windows, OS/2, Macintosh, or UNIX operating systems, which is represented in FIG. 5 by the screen display on the monitor 212. The computer 210 executes one or more computer programs 226, which are represented in FIG. 5 by the "windows" displayed on the monitor 212, under the control of the operating system 224. The present invention comprises a data recovery management function that is preferably implemented in the operating system 224 and/or computer programs 226.

Generally, the operating system 224 and the computer programs 226 may be tangibly embodied in a computer-readable medium or carrier, e.g., one or more of the fixed and/or removable data storage devices 214 and 216, or other data storage or data communications devices. Both the operating system 224 and the computer programs 226 may be loaded from the data storage devices 214 and 216 into the random access microprocessor as discussed above with reference to FIG. 5. Both the operating system 224 and the computer programs 226 comprise instructions which, when read and executed by the microprocessor of the computer 210, causes the computer 210 to perform the steps necessary to execute the steps or elements of the present invention.

Although an exemplary computer system configuration is illustrated in FIG. 5, those skilled in the art will recognize that any number of different configurations performing similar functions may be used in accordance with the present invention.

It will be understood by those of skill in the art that the embodiments described herein do not limit the following claims. In contrast, many equivalents of the elements described are contemplated and encompassed by this invention.

What is claimed is:

1. A method of recovering data from an unreliable tape within a tape server, the tape server comprising a plurality of tape drives, a direct access storage device, and a storage manager, where data is stored on the direct access storage device and stored on one or more tapes, the method comprising the steps of:

querying the storage manager for a list of all volumes that have been written to the unreliable tape;

determining a status of a volume on the list;

writing the volume onto the direct access storage device from the unreliable tape where indicated by the status of the volume; and causing the volume that is stored on the direct access storage device to appear to be a new version of the volume where indicated by the status of the volume.

2. The method of claim 1, the step of determining a status further comprising identifying the volume as:

resident where the volume is also stored on the direct access storage device and any versions of the volume that are stored on a tape have been superseded by the version on the direct access storage device, migrated where the volume is only stored on one or more tapes, or premigrated where the volume is stored on the direct access storage device and any versions of the volume that are stored on a tape are not superseded by the version on the direct access storage device.

3. The method of claim 2, wherein the volume that is stored on the direct access storage device is made to appear to be a new version of the volume when the status of the volume is premigrated.

4. The method of claim 2, wherein the volume is written onto the direct access storage device from the unreliable tape and the volume on the direct access storage device is made to appear to be a new version of the volume when the status of the volume is migrated and the volume on the unreliable tape is the most recent volume.

5. The method of claim 1, further comprising queuing the volume for storage on a tape, after causing the volume to appear to be a new version.

6. The method of claim 1, the step of making the volume appear to be a new version of the volume comprising creating a new external object identification for the volume.

7. The method of claim 1, further comprising the step of determining a status and all subsequent steps for each volume on the list of volumes stored on the unreliable tape.

8. The method of claim 1, further comprising informing the storage manager of a current location for all volumes on the tape server.

9. The method of claim 1, further comprising assigning an expired status to all volumes on the unreliable tape after all other steps have been performed.

10. The method of claim 9, further comprising confirming that the unreliable tape contains no non-expired data after all other steps have been performed.

11. The method of claim 1, further comprising assigning the unreliable tape to be a scratch tape.

12. The method of claim 7, further comprising instructing the storage manager to eject the tape after all other steps have been performed.

13. The method of claim 12, further comprising sending a message that the unreliable tape has been ejected.

14. The method of claim 7, further comprising the step of attempting the steps again until a maximum number of retry attempts is reached, when any of the steps are not successfully completed.

15. The method of claim 14, further comprising:

querying the storage manager for a list of all volumes that have been written to the unreliable tape when the maximum number of retry attempts is reached;

determining a recall list of volumes that would be recalled during read-only processing; and notifying an operator that the volumes on the recall list are no longer accessible.

16. A method of recovering data from an unreliable tape within a tape server, the tape server comprising a plurality of tape drives, a direct access storage device, and storage manager, where data is stored on the direct access storage device and stored on one or more tapes, the method comprising the steps of:

querying the storage manager for a list of all volumes that have been written to the unreliable tape;

determining a status of a volume on the list as being:

resident where the volume is also stored on the direct access storage device and any versions of the volume that are stored on a tape have been superseded by the version on the direct access storage device, migrated where the volume is only stored on one or more tapes, or premigrated where the volume is stored on the direct access storage device and any versions of the volume that are stored on a tape have not been superseded by the version on the direct access storage device;

causing the volume that is stored on the direct access storage device to appear to be a new version of the volume when the volume is premigrated; and writing the volume onto the direct access storage device from the unreliable tape and causing the volume on the direct access storage device to appear to be a new version of the volume when the volume is migrated and is a most recent volume.

17. A system for recovering data from an unreliable tape within a tape server, the system comprising:

a direct access storage device;

a plurality of tape drives, operatively coupled to the direct access storage device to receive data;

a storage manager;

a query subsystem configured to query the storage manager for a list of all volumes that have been written to the unreliable tape and determining a status of a volume on the list;

a write subsystem configured to write the volume onto the direct access storage device from the unreliable tape where indicated by the status of the volume; and an update subsystem configured to cause the volume that is stored on the direct access storage device to appear to be a new version of the volume where indicated by the status of the volume.

18. The system of claim 17, further comprising a queue configured to queue a volume for storage on a tape.

19. The system of claim 17, further comprising a synchronization subsystem configured to inform the storage manager of a current location for all volumes on the tape server.

20. The system of claim 17, further comprising a dating subsystem configured to assign an expired status to all volumes on the unreliable tape.

21. The system of claim 17, further comprising a confirmation subsystem configured to confirm that the unreliable tape contains no non-expired data.

22. The system of claim 17, further comprising a scratch subsystem configured to assign the unreliable tape to be a scratch tape.

23. The system of claim 17, the tape devices further comprising an eject subsystem.

24. An article of manufacture comprising a program storage medium readable by a computer having a memory, the medium tangibly embodying one or more programs of instructions executable by the computer to perform method steps for recovering data from an unreliable tape within a tape server, the tape server comprising a plurality of tape drives, a direct access storage device, and a storage manager, where data is stored on the direct access storage device and stored on one or more tapes, the method comprising the steps of:

querying the storage manager for a list of all volumes that have been written to the unreliable tape;

determining a status of a volume on the list;

writing the volume onto the direct access storage device from the unreliable tape where indicated by the status of the volume; and causing the volume that is stored on the direct access storage device to appear to be a new version of the volume where indicated by the status of the volume.

* * * * *